United States Patent [19]

Dobbs

[11] Patent Number: 4,696,127
[45] Date of Patent: Sep. 29, 1987

[54] CONTAINER FOR CAPTURING INSECTS

[76] Inventor: Nathan F. Dobbs, P.O. Box 1075, Ormond Beach, Fla. 32074

[21] Appl. No.: 944,185

[22] Filed: Dec. 22, 1986

[51] Int. Cl.$^4$ ............................................. A01M 1/14
[52] U.S. Cl. ......................................... 43/121; 43/114
[58] Field of Search ..................... 43/121, 114, 115, 58

[56] References Cited

U.S. PATENT DOCUMENTS

| | | | |
|---|---|---|---|
| 181,165 | 8/1876 | Hagen | 43/121 |
| 1,372,946 | 3/1921 | Erickson | 43/121 |
| 3,913,259 | 10/1975 | Nishimura | 43/114 |
| 4,214,400 | 7/1980 | Patmore | 43/121 |
| 4,263,740 | 4/1981 | Hemsarth | 43/121 |
| 4,608,774 | 9/1986 | Sherman | 43/114 |

Primary Examiner—Gene P. Crosby
Attorney, Agent, or Firm—Duckworth, Allen & Dyer

[57] ABSTRACT

A roach trap formed in the shape of a truncated pyramid having a relatively flat top surface has a concavity formed in the top surface. A pair of parallel slits extend across the concavity defining a narrow strip. The strip can be pushed outward to form a convex shape so that the slits are spread to create entranceways into the trap. The trap is closed by pushing the strip downward to its original concave shape thus providing a closeable trap which can be disposed of without having an opening allowing trapped roaches to escape.

10 Claims, 4 Drawing Figures

4,696,127

CONTAINER FOR CAPTURING INSECTS

FIELD OF THE INVENTION

This invention relates in general to an apparatus used for capturing insects and in particular to an improved trap for capturing and preventing the escape of cockroaches therefrom.

BACKGROUND OF THE INVENTION

Numerous chemical and nonchemical means have been developed in order to exterminate or otherwise dispose of insects. It is generally recognized that no method has been completely successful for eradicating cockroaches. Because insects often build up a resistance to chemical treatments, pesticides have in recent years become increasingly concentrated and lethal. Consequently, their toxic nature and physiological effects on humans, have become of increased concern to the general population. Undesirable odors and headaches which result from inhaling these chemicals are a few examples of pesticide side effects. These concerns are most acute when pesticides are applied in buildings and other confined areas in which the air is stagnant. Because of their toxic effects and odors, application of these chemicals in food areas and where children are present is often avoided. Despite these undesirable features, non-chemical extermination means such as traps have not supplanted chemical pesticides because of their limited effectiveness. In the past, numerous designs for roach traps have had some success using an adhesive surface within the traps in order to confine cockroaches. Examples include U.S. Pat. No. 4,214,400 to Patmore et al. and U.S. Pat. No. 3,913,259 to Nishimura. However, it is believed that these and other devices have had limited success because some insects are able to eventually escape the trap. In particular, when prior art throwaway traps are disposed of, by throwing into trash receptacle for example, the entrance to such traps may become oriented such that roaches can readily escape the trap thus obviating its utility.

SUMMARY OF THE INVENTION

Among the several objects of the present invention may be noted an improved container for trapping cockroaches and other insects; the provisions of such improved container including an adhesive surface for confining insects; the provisions of such improved container including a hollow cavity having a closeable entrance to prevent insects from escaping; the provisions of such improved container in which no toxic chemicals or unnatural odors are present; the provisions of such improved container in which the container is made of inexpensive lightweight flexible material; the provisions of such improved container including a shape which conceals trapped insects from ordinary view. These as well as other objects and advantageous features of the present invention will be in part apparent and in part pointed out hereinafter. The invention is suitable for safe, effective and nontoxic extermination of cockroaches in all environments.

In general, an insect trap is provided with adjustable entrance openings which are opened to allow insects to enter and which are closed to prevent insects from exiting a hollow cavity.

DETAILED DESCRIPTION

Figure 1:
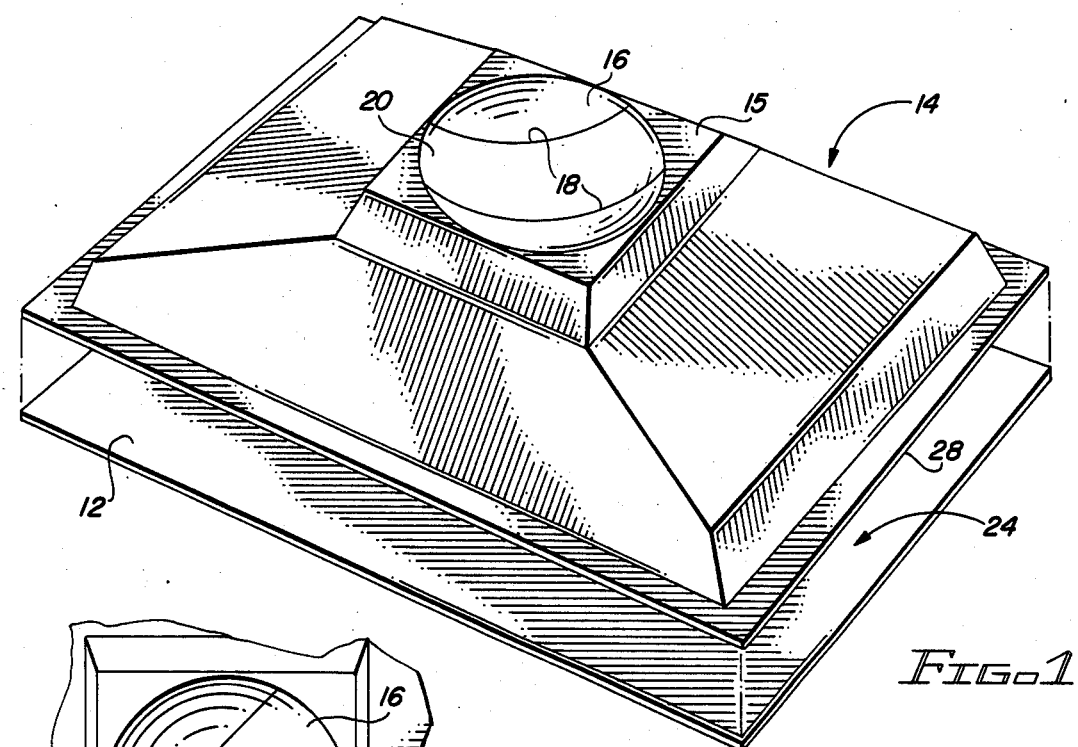
FIG. 1 is a perspective view of the inventive container prior to assembly.
Figure 2A:
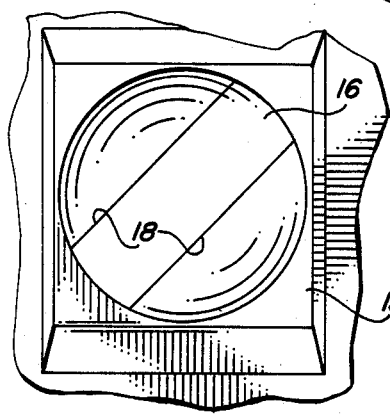
FIGS. 2(A-B) illustrate the invention's adjustable entrance slits.
Figure 2B:
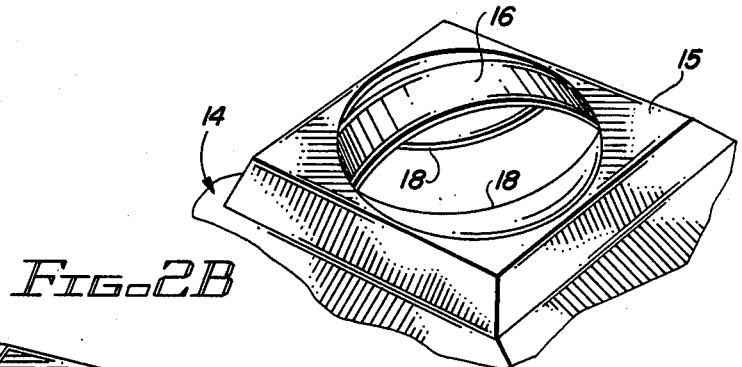
Figure 3:
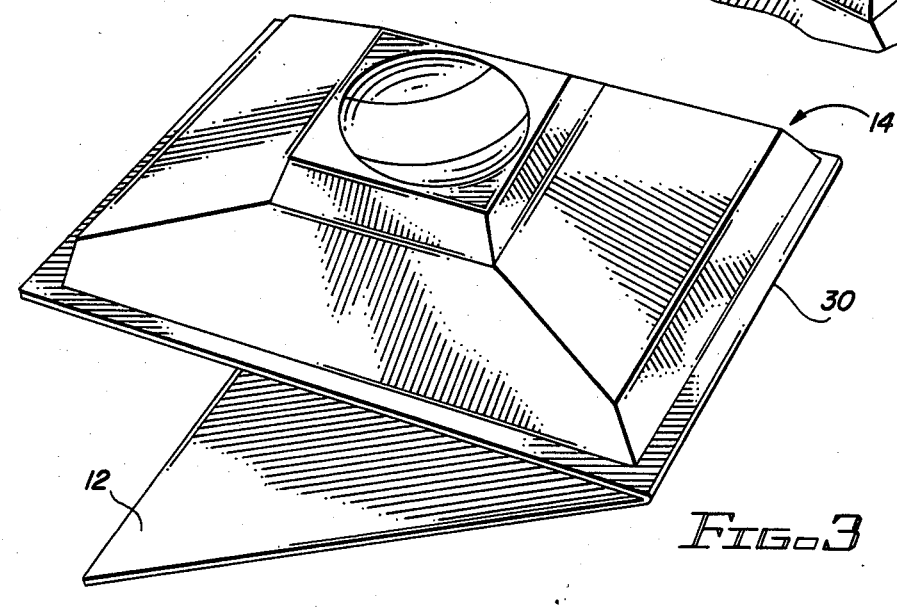
FIG. 3 illustrates an alternative embodiment of the inventive container prior to assembly wherein the base member is integrally formed with and pivotally attached to the top portion.

Referring now to FIG. 1, there is shown a preferred embodiment of an inventive throw-away container 10 suitable for capture and permanent disposal of crawling insects such as cockroaches. The container comprises a base 12 and a hollow top portion 14. In the preferred embodiment the base 12 is formed from a heavy paper, cardboard or plastic while top portion 14 is molded plastic. Alternatively the entire container can be formed from thermoform plastic with the base 12 pivotally attached to the top portion 14 at an attachment edge 28 as shown in FIG. 3. While these materials have been chosen for reasons of economy, it is understood that the inventive container can be made from other materials. The top portion 14 is formed in the shape of a truncated pyramid having an upper surface 15. The surface 15 includes closeable entrance means for allowing insects to enter the hollow cavity formed by base 12 and top portion 14 in the assembled position, the entrance means being set to either an open or closed position to allow insects to enter and to prevent insects from exiting the hollow cavity. In the preferred embodiment, a flexible concave region 16 is formed in surface 15 and has a pair of parallel slits 18 extending across the concave region, the slits defining two edges of a strip. Preferably, the slits 18 are oriented diagonally with respect to the truncated top surface 15 of portion 14. Flexible strip 20 may be pushed above concave region 16 so that it forms the convex shape shown in the parallel perspective view of FIG. 2B. It will be apparent that the change in contour of strip 20 has altered each slit 18 from a narrow line as illustrated in FIG. 1 to a larger opening whose shape is defined by the bordering edges of concave region 16 and convex strip 20. While the use of a concave region having parallel slits illustrates the prepared embodiment of my invention, the primary intent is to provide an easily closeable entrance to the trap and, accordingly, other arrangements may be possible. FIG. 2A is a top view of surface 15.

An upper surface 24 of base 12 is coated with an adhesive composition (not shown) for trapping crawling insects. Suitable compositions are disclosed in U.S. Pat. No. 3,913,259. The composition also serves the function of bonding the underside of the top portion's lower edge 28 along the peripheral edge 30 of the upper surface of base 12. Other means of attaching the base 12 to top portion 14 are well known in the art. Although the shape of the container is generally that of a truncated pyramid with concave region 16 located at the top, other geometries and configurations may be effective for achieving the objects of the invention.

Having first described the essential features of the invention, a method of using the sealable container for capturing and permanently disposing of crawling insects is now presented. Prior to attaching base 12 to top portion 14, the container is prepared for capturing insects by pushing flexible strip 20 into a convex position above concave region 16 thus forming each slit 18 into a large opening suitable for the entrance of insects. A small amount of bait is placed on the adhesive coated upper surface 24 of base 12. The bait may consist of cereal, crackers or other food known to attract insects. Next, base 12 is attached to the portion 14 along edge 28 by pressing the edges together so that the adhesive bonds the two pieces. The container is then placed in a location where crawling insects may be found. By way of example the location may be on a kitchen floor, near a water fixture or in a cupboard. The container can be placed near foods without concern for contamination. Insects attracted to the food will enter the container through the large slit openings 16 and become stuck to the adhesive as they seek the bait. Furthermore, the pyramid shape inhibits the ability of the insects to crawl out of the trap. The container may be relocated among several areas of infestation until either the container is full of insects or the adhesive coated surface loses its effectiveness.

After the trap becomes filled with insects to the point that further insects cannot be trapped, flexible surface 20 is depressed into a concave position so that the pair of slits 18 become too narrow for the trapped insects to pass through, thus sealing the insects within the container. The container is then disposed of without threat of eventual escape of insects even if the adhesive loses its sticky properties or the trap becomes oriented in a non-upright position.

While the base member 12 may be formed as a separate element as shown in FIG. 1, an alternate arrangement is shown in FIG. 3 in which the top portion 14 and base 12 are simultaneously formed from a plastic sheet material. The base 12 may then be folded along the line 30 to cover the open bottom of portion 14. The advantage of this latter arrangement is to eliminate manufacturing of separate components and subsequent packaging of two components for assembly.

While the invention is described in what is presently considered to be a preferred embodiment, many modifications and variations will become apparent to those skilled in the art. Accordingly, it is intended that the invention be given a scope commensurate with the appended claims.

I claim:

1. A sealable container for capturing insects comprising:
    (a) a base member having:
        (i) an upper side;
        (ii) a lower side; and
        (iii) a peripheral edge which borders said upper and lower sides;
    (b) a top portion attachable to said base member, wherein said top portion defines a hollow cavity and comprises:
        (i) a lower edge which is attachable to the upper side of said base member along the peripheral edge; and
        (ii) ingress means openable and closeable for allowing insects to enter the hollow cavity when opened and for preventing insects from exiting the hollow cavity when closed;
    (c) attachment means for securing the lower edge of said top portion to the upper side of said base member along the peripheral edge thereof; and
    (d) adhesive means placed at least on the upper side of said base member for trapping insects within the hollow cavity when said top portion is attached to said base member.

2. The container of claim 1 wherein said base member is flat and said attachment means forms a seal between said top portion and said base member which prevents insects from escaping by passing between the lower edge of said top portion and the peripheral edge of said base member.

3. The container of claim 2 wherein said ingress means comprises a concave region on the outer surface of said top portion, said concave region including a flexible strip defined by a pair of narrow parallel slits, said flexible strip being connected to said top portion by ends thereof.

4. The container of claim 2 wherein:
    (a) said top portion comprises a truncated pyramidal shape having an open base for attachment to said base member and a concave region formed in an upper surface thereof; and
    (b) said ingress means comprising a pair of parallel slits defining a strip through a central portion of said concave region, said strip being positionable in a convex arrangement for opening the slits for the ingress of insects into the container.

5. The container of claim 3 wherein said flexible strip may be alternately pushed into and out of the concave region so that when said flexible surface is pushed out of the concave region it forms a convex shape opposite the aforedefined concave region such that a first side of each slit will follow a concave contour while a second side of each slit will follow a convex contour, thus forming a pair of collapsible entrances which allow insects to enter the hollow cavity.

6. The container of claim 5 wherein said top portion is formed of a flexible plastic material.

7. The container of claim 6 wherein said attachment means comprises said adhesive means.

8. The container of claim 7 wherein said adhesive means comprises a layer of sticky composition suitable for capturing insects.

9. An insect trap comprising:
    a thermoform plastic housing having an upper portion in the shape of a truncated pyramid with an open base and a substantially flat top;
    a relatively flat base member adapted to cover said open base of said housing, said base member being formed integrally with said housing and being attached thereto along one edge thereof, said base member being pivotable about said attachment edge for pivoting into sealing relationship over said open base;
    a concave depression formed in said flat top and having a pair of parallel slits thereacross defining a concave shaped strip extending across said depression, said strip being positionable in both a concave shape and a convex shape, the slits being opened by positioning of said strip in the convex shape for allowing insects to enter said trap and the slits being closed by depression of said strip to the concave shape to contain the insects therein.

10. The trap of claim 9 wherein a surface of said base member positioned inside said trap when said base member is in said sealing relationship is coated with an adhesive for capturing the insects.

* * * * *